US010686807B2

(12) United States Patent
Zenz et al.

(10) Patent No.: US 10,686,807 B2
(45) Date of Patent: Jun. 16, 2020

(54) INTRUSION DETECTION SYSTEM

(71) Applicant: INTERNATIONAL BUSINESS MACHINES CORPORATION, Armonk, NY (US)

(72) Inventors: Gideon Zenz, Kassel (DE); Volker Vogeley, Sooden-Allendorf (DE); Dirk Harz, Kassel (DE); Mark Usher, Göttingen (DE); Astrid Granacher, Amstetten (DE)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/005,747

(22) Filed: Jun. 12, 2018

(65) Prior Publication Data

US 2019/0379677 A1    Dec. 12, 2019

(51) Int. Cl.
*G06F 21/00* (2013.01)
*H04L 29/06* (2006.01)
*G06Q 10/10* (2012.01)
*H04L 12/58* (2006.01)
*G06F 16/28* (2019.01)

(52) U.S. Cl.
CPC ........ *H04L 63/1416* (2013.01); *G06F 16/285* (2019.01); *G06Q 10/107* (2013.01); *H04L 51/12* (2013.01)

(58) Field of Classification Search
None
See application file for complete search history.

(56) References Cited

U.S. PATENT DOCUMENTS

| 7,530,105 B2 * | 5/2009 | Gilbert ................... G06F 21/55 709/222 |
| 7,865,561 B2 | 1/2011 | Kelly et al. |

(Continued)

FOREIGN PATENT DOCUMENTS

WO    2013055538 A1    4/2013

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Maung T Lwin
(74) *Attorney, Agent, or Firm* — Tihon Poltavets

(57) ABSTRACT

A method for classification of suspicious activities is provided. In the method, a first intrusion detection system comprising a normal operation mode and which is connected to a second intrusion detection system by a first communications connection is implemented. In response to detecting a malfunction of the first communications connection, the first intrusion detection system is switched from the normal operation mode to a limited operation mode for receiving first data from one or more honeypot systems and second data from the second intrusion detection system. A prediction model for representing malicious attacks is generated by execution of a predefined classification algorithm with respect to the received data, wherein the predefined classification algorithm further determine a model evaluation metric with respect to the prediction model. The prediction model is deployed to detect the malicious attacks if the model evaluation metric meets a predefined validation condition.

18 Claims, 11 Drawing Sheets

(56) References Cited

U.S. PATENT DOCUMENTS

| | | | |
|---|---|---|---|
| 8,887,286 B2* | 11/2014 | Dupont | G06F 21/00 726/25 |
| 9,094,257 B2 | 7/2015 | Morrill et al. | |
| 9,165,051 B2* | 10/2015 | Masud | G06F 16/285 |
| 9,176,834 B2 | 11/2015 | Griffith et al. | |
| 9,386,030 B2* | 7/2016 | Vashist | H04L 63/1416 |
| 2008/0059590 A1 | 3/2008 | Sarafijanovic et al. | |
| 2009/0064323 A1 | 3/2009 | Lin | |
| 2010/0332601 A1 | 12/2010 | Walter et al. | |
| 2016/0078124 A1 | 3/2016 | Wilson et al. | |
| 2016/0308892 A1* | 10/2016 | Hohndel | H04L 63/1416 |
| 2018/0219889 A1* | 8/2018 | Oliner | G06N 3/08 |

* cited by examiner

INTRUSION DETECTION SYSTEM

BACKGROUND

The present invention relates to the field of digital computer systems, and more specifically, to a method for classification of suspicious activities by an intrusion detection system.

Threat intelligence systems provide real time actionable data for e.g. firewalls. Observed attacks from IP addresses are processed and shipped to customer appliances to ensure immediate protection. The threat intelligence systems may employ algorithms for classification and statistical analysis of observed attacks. However, there is a continuous need to increase the availability of such systems.

SUMMARY

Various embodiments provide a method for classification of suspicious activities, intrusion detection system, and computer program product as described by the subject matter of the independent claims. Advantageous embodiments are described in the dependent claims. Embodiments of the present invention can be freely combined with each other if they are not mutually exclusive.

In one aspect, the invention relates to a method for classification of suspicious activities by a first intrusion detection system, the first intrusion detection system being connected to at least one second intrusion detection system via a respective first connection, wherein in a normal operation mode of the first intrusion detection system, the first intrusion detection system is configured for receiving first data from respective honeypot systems and second data from the second intrusion detection system, running a predefined classification algorithm using the received data for generating a prediction model of malicious attacks, determining a model evaluation metric of the prediction model, and providing the prediction model if the model evaluation metric fulfills a predefined validation condition. The method comprises: upon detecting a malfunction of at least the first connection, switching into a limited operation mode of the first intrusion detection system; and thereafter modifying the validation condition based on the amount of the received data after the malfunction is detected; rerunning the classification algorithm using at least the data received after the malfunction detection, thereby updating the prediction model and determining the model evaluation metric of the updated prediction model; providing the updated prediction model if the model evaluation metric fulfils the modified validation condition; repeating zero or more times the rerunning and the providing steps until recovering at least the malfunctioning first connection; upon recovering the malfunctioning first connection providing the updated prediction model or a combined model resulting from a combination of the updated model with the lastly generated prediction model, and switching back to the normal operation mode.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to an intrusion detection system for classification of suspicious activities, the intrusion detection system being configured to connect to at least one second intrusion detection system via a respective first connection, wherein in a normal operation mode of the intrusion detection system, the intrusion detection system is configured for receiving first data from respective honeypot systems and second data from the second intrusion detection system, running a predefined classification algorithm using the received data for generating a prediction model of malicious attacks, determining a model evaluation metric of the prediction model, and providing the prediction model if the model evaluation metric fulfills a predefined validation condition. The intrusion detection system is further configured for: upon detecting a malfunction of at least the first connection, switching into a limited operation mode; and thereafter; modifying the validation condition based on the amount of the received data after the malfunction is detected; rerunning the classification algorithm using at least the data received after the malfunction detection, thereby updating the prediction model and determining the model evaluation metric of the updated prediction model; providing the updated prediction model if the model evaluation metric fulfils the modified validation condition; repeating zero or more times the rerunning and the providing steps until recovering at least the malfunctioning first connection; upon recovering the malfunctioning first connection providing the updated prediction model or a combined model resulting from a combination of the updated model with the lastly generated prediction model, and switching back to the normal operation mode.

BRIEF DESCRIPTION OF THE DRAWINGS

In the following embodiments of the invention are explained in greater detail, by way of example only, making reference to the drawings in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
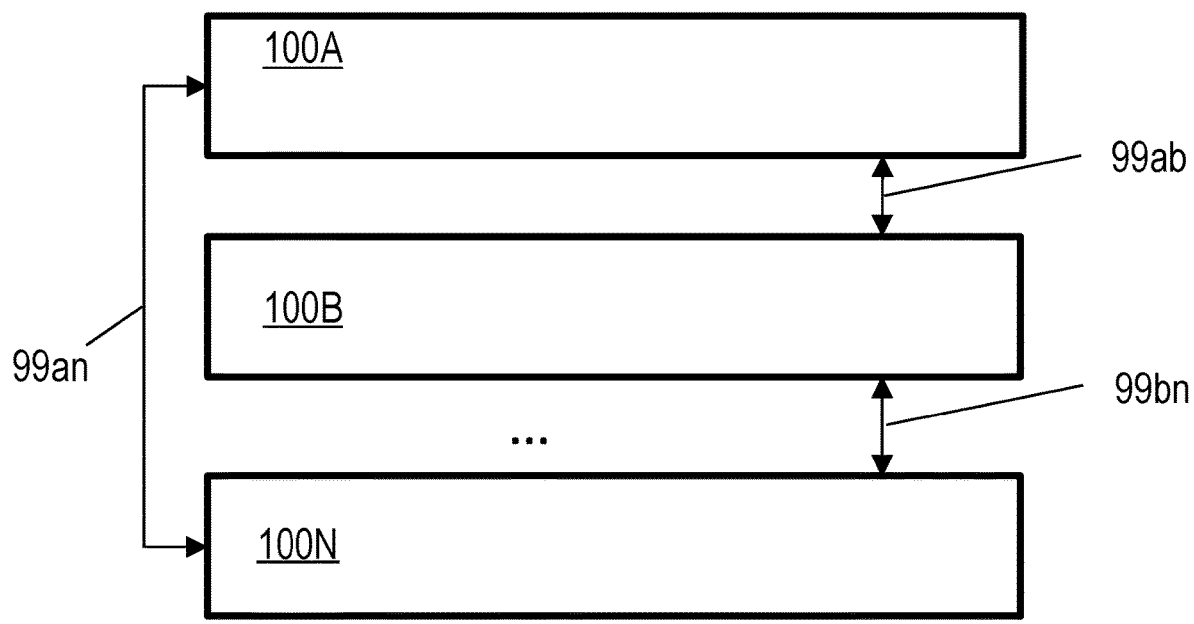
FIG. 1 depicts multiple threat intelligence systems.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

For example, the at least first and second threat intelligence systems may comprise spam filter systems, wherein each spam filter system receives, in the normal operation mode, the same filter definitions from the at least other spam filter system of the cluster. If at least one of the spam filter system of the cluster becomes disconnected, some of the filter definition data (e.g. filter definitions may be part of the generated models) does not arrive, yet the other spam filter system switches to a limited operation mode or failure mode, preserving the current state of the operating mode as recovery state and continues to operate in the limited operation mode without receiving at least part of filter definitions of the other spam filter system until it is able to reconnect to the cluster. Once the spam filter system reconnects to the cluster, the partitioned spam filter system rolls back to the preserved recovery state, acquires missing filter definition data from the disconnected spam filter system, switches to normal operating mode and continues processing normally.

A honeypot system is a system that is configured to be probed, attacked or compromised by attackers. The honeypot system may be used to lure hackers by exposing known vulnerabilities deliberately. The honeypot system may be configured to gather and record information and attack patterns e.g. information related to a hacker's location, his behavior and the tools used by the hacker, copies of worms and payloads which hackers use to compromise the system, email spams etc. For example, during the time a hacker has access to the honeypot system, hacker activities may be logged to collect information defining his/her actions and techniques. This information may be used to find security solutions for network attacks and prevent them in the future. The honeypot system may for example be a spam honeypot for processing spams e.g. for identifying IP addresses sources of the spams. The honeypot system may for example comprise an OS and applications. The honeypot system may for example provide output data in a document store structured format such as XML or JSON formats or in a table format comprising one or more tables.

A "model" may for example be an equation or set of rules that makes it possible to predict an unmeasured value from other, known values. For example, a model can be used to predict if received message is a spam or non-spam message.

The present method may enable a hybrid approach, which may allow decentralized training instances with only local knowledge to continue updating globally computed signatures in case of system failures. In order to achieve fail safety, all systems may be available on separate geographical locations. In case of failure of a component, the other redundant one takes over. The final training stages synchronize their data to ensure the same state. While this achieves fail safety, it incurs high cost as all data has to be constantly synchronized over all systems, and all systems share the same workload. The present system is aware of system failure, e.g. if the synchronization connections are severed. In case some or all of the connections fail, the system switches to a limited operation mode of the classifiers. For example, in the case of spam or virus filtering, or IP reputation, updated filters and signatures may be provided to effectively detect new kinds of spams, which can and do arise at any given point in time.

The present method may have the advantage of increasing the availability of the thereat intelligence systems.

According to one embodiment, switching back to the normal operation mode comprises synchronizing data with the second intrusion detection system, thereby receiving third data, wherein the third data comprises second data that was not received by the first intrusion detection system during the malfunctioning of the first connection, wherein operating in the normal operation mode is performed using received first, second and third data. For example, the switching back to the normal operation mode is performed after the synchronization of the data. The data is synchronized means that the connected threat intelligence systems comprise the same data after synchronization. This may enable to recover the status of the attacks during the malfunction of the connections which may further increase the reliability of the rules or models generated by the present method.

According to one embodiment, the first intrusion detection system is connected to multiple other intrusion detection systems via respective connections, wherein the malfunction is detected if the fraction of malfunctioning connections is higher than a predefined threshold. According to one embodiment, the malfunction is detected if $\Delta f/\Delta t > T\_2$. $\Delta f/\Delta t$ refers to the number of failures happened during $\Delta t$.

For example, a connectedness metric may be defined. The connectedness metric may be as follows:

$$\frac{\text{number of live or current connections}}{\text{number of expected connections}} \text{ or } \frac{\Delta f}{\Delta t},$$

the quotient of connection failures over time. Using values of the connectedness metric it may be determined if a failure mode is to be used. For example, a threshold may be defined (e.g. T_2) such that if the value of the connectedness metric is higher than the threshold, the system may operate in the limited operation mode. These embodiments may enable an accurate and systematic method for triggering the limited operation mode.

According to one embodiment, the second data is indicative of a prediction model generated using the classification algorithm by the second intrusion detection system. The second data may for example comprise data received from honeypot systems of the second threat intelligence system and the prediction model generated by the second intrusion detection system.

According to one embodiment, the rerunning is performed using the received first data and second data received before the malfunction is detected. That is, the predefined classification algorithm may be re-executed with respect to the received first and second data as received before the malfunction is detected. This may increase the data sample used for generating the model and may thus increase the accuracy of the generated model.

According to one embodiment, the running (i.e., executing the predefined classification algorithm) comprises identifying one or more signatures, wherein the prediction model is configured for comparing data with the signatures for determining based on the comparison result if the data is of a malicious event. This may enable a signature based intrusion detection system.

According to one embodiment, the comparison is performed using signatures having a weight higher than a predefined weight threshold, wherein the weight is indicative of occurrence frequency of the signature. This may further increase the accuracy and reliability of the model generated as only relevant signatures are used.

According to one embodiment, each signature of the signatures is identified in at least one dataset of a given data type, the synchronizing of data comprising: for each signature of the signatures determining the number of datasets of same data type that contains the signature, and if the determined number is within a predefined range, the synchronizing comprising sending the determined datasets to the second intrusion detection system. The predefined range is used because extremely rare events convey no significance, while extremely frequent events are long going campaigns which should already be known to all sides.

According to one embodiment, the model evaluation metric is a classification accuracy of the classification algorithm, wherein the validation condition requires that the classification accuracy is higher than a predefined accuracy threshold.

According to one embodiment, modifying (i.e., updating) the condition comprises lowering the accuracy threshold. This may adapt to the operation mode of the first intrusion detection system.

According to one embodiment, the lowering of the accuracy threshold is performed based on the number of malfunctioning connections. The higher the number malfunctioning connections the lower the threshold is.

According to one embodiment, the prediction model is configured to predict if a message is a spam or non-spam message by comparing one or more signatures of the model with corresponding signatures in received data. This embodiment may seamlessly be integrated in existing spam detection systems.

According to one embodiment, the prediction model has prediction model variables comprising at least one of: the number of occurrences of one or more predefined terms, spam token count, IP address values, URLs, hashes, email addresses etc. For example, the prediction model may comprise rules or conditions on at least one of the prediction model variables.

FIG. 1 depicts multiple threat intelligence systems 100A-100N. For example, the multiple threat intelligence systems 100A-100N may form or be part of a cluster. Threat intelligence systems of each pair of the threat intelligence systems 100A-N are connected to each other via one or more connections 99$ij$ (where i=a, b, . . . , n and j=a, b, . . . , n) such as 99$ab$, 99$bn$, 99$an$. For example, each pair of components of a pair of the threat intelligence systems 100A-N may be connected via a respective connection e.g. via network adapters.

A connection may for example be established via a local area network (LAN), a general wide area network (WAN), and/or a public network (e.g., the Internet).

Figure 2:
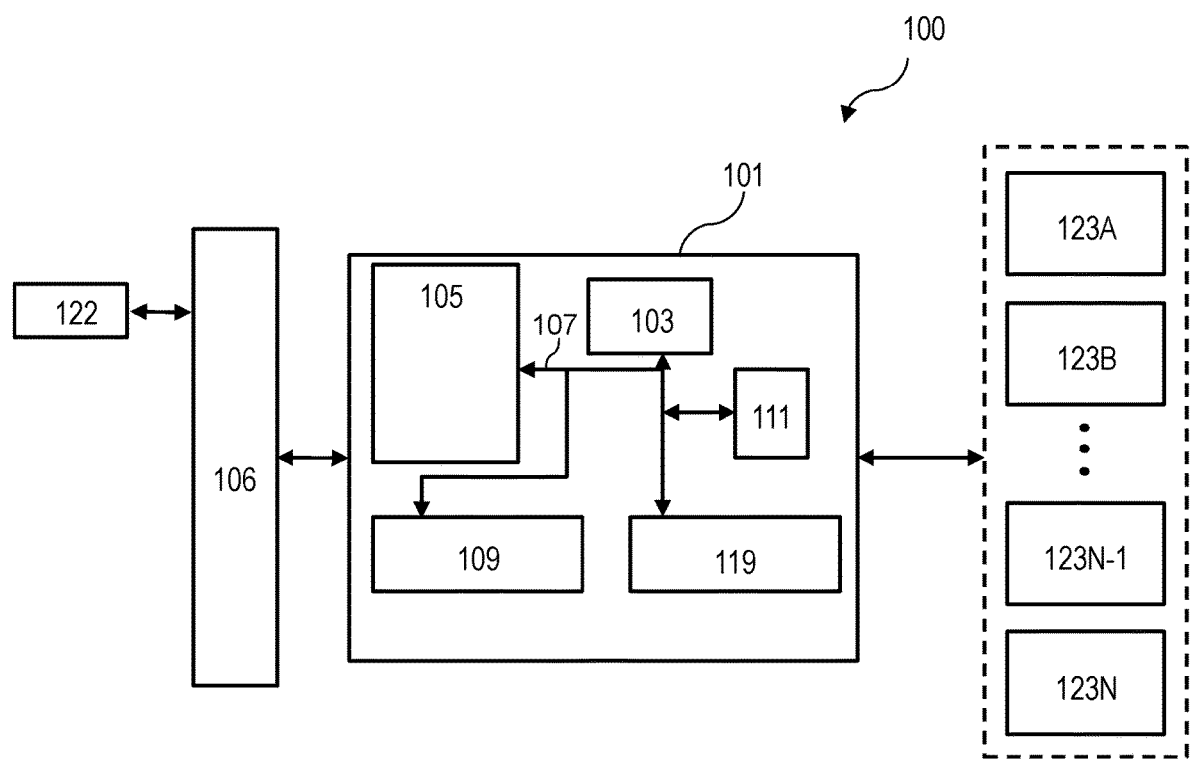
FIG. 2 depicts an exemplary architecture of a threat intelligence system in accordance with the present disclosure.

FIG. 2 depicts an exemplary architecture of a threat intelligence system 100 (e.g. a threat intelligence system of FIG. 1) in accordance with the present disclosure. The threat intelligence system 100 comprises an intrusion detection system 101. The intrusion detection system 101 may be a computer system. The components of intrusion detection system 101 may include, but are not limited to, one or more processors or processing units 103, a storage system 111, a memory system 105, and a bus 107 that couples various system components including memory system 105 to processor 103. Memory system 105 may include computer system readable media in the form of volatile memory, such as random access memory (RAM) and/or cache memory.

Intrusion detection system 101 may include a variety of computer system readable media. Such media may be an available media that is accessible by intrusion detection system 101, and it includes both volatile and non-volatile media, removable and non-removable media.

Intrusion detection system 101 may communicate with one or more external devices such as a keyboard, a pointing device, a display, etc.; one or more devices that enable a user to interact with intrusion detection system 101; and/or any devices (e.g., network card, modem, etc.) that intrusion detection system 101 to communicate with one or more other computing devices. Such communication can occur via I/O interface(s) 119. Still yet, intrusion detection system 101 can communicate with one or more networks such as a local area network (LAN), a general wide area network (WAN), and/or a public network (e.g., the Internet) via network adapter 109. As depicted, network adapter 109 communicates with the other components of intrusion detection system 101 via bus 107.

Memory system 105 is configured to store a plurality of applications that are executable on the processor 103. For example, the memory system 105 may comprise an operating system as well as application programs. The methods described herein may at least partly be implemented in a software application stored in the memory system 105.

Intrusion detection system 101 may be configured for receiving data from a honeypot system 122. The data of the honeypot system 122 may for example be received via the ETL module 106. The connection to the honeypot system 122 may be via a wired connection or via a network, which may be a public network, such as the Internet, a private network, such as a wide area network (WAN), or a combination thereof. The honeypot system 122 may be configured to identify attackers by IP-addresses which can be used in filter rules and block the access to production systems. The data received from the honeypot system 122 may be in a predefined structure indicative for example of the identified IP addresses of the attackers and information on the attackers. For example, the honeypot system 122 may be configured to provide as output one or more tables, wherein each table comprises attributes or columns indicative of the attack and the attacker. For example, a first table may comprise attributes indicative (e.g. for a given record) of the session id, the start time and end time of the session, corresponding IP address of the attacker, the SSH client the attacker used, and IP addresses (e.g. a range of IP addresses) that have the same specific pattern as the present attack described by at least the given record. Another table may for example indicate detailed information about the inputs for an attack such as session id, timestamp, the command used and also information if the command were successful or not.

The honeypot system 122 may be configured to send automatically or upon request data sets to intrusion detection system 101. The data may be received via an Extract-Transform-Load (ETL) module 106. The ETL module 106 may for example be configured to extract or receive data from honeypot system 122 and perform an ETL process on the received data. The ETL process may, for example, transform the IP address format in the received data to a predefined format and load it into the intrusion detection system 101.

The received data from the honeypot system 122 may be processed by the intrusion detection system 101 as for example described with reference to following figures.

Although shown as a separate component, the ETL module 106 may, in one example, be part of the intrusion detection system 101. The intrusion detection system 101 may further be configured to connect to a data store for storing data of the intrusion detection system 101. The data store may, in another example, be part of the storage system 111.

The intrusion detection system 101 may be connected to firewall systems 123A-N (including firewall systems 123B and 123N-1) of respective internal networks. The connection to the firewall systems 123A-N may be via a wired connection or via a network, which may be a public network, such as the Internet, a private network, such as a wide area network (WAN), or a combination thereof. Each of the firewall systems 123A-N may be configured to monitor and control incoming and outgoing network traffic from the respective internal networks based on predetermined security rules. The security rules may for example be updated using the data (e.g. the data may comprise IP addresses and related information obtained from the honeypot system 122 and the data sources 121) received from the intrusion detection system 101.

The threat intelligence system 100 may be configured to receive data from other, connected threat intelligence systems. For example, if N=3 in FIG. 1, the threat intelligence system 100A may receive data from two threat intelligence systems 100B and 100N.

The intrusion detection system 101 may be configured to process the received data of the honeypot system 122 and the other threat intelligence systems in order to identify IP addresses indicated in the received data and associated information such as session IDs, start and end time etc.

The intrusion detection system 101 may be configured to operate in at least one operation mode. In a normal operation mode of the intrusion detection system 101, the intrusion detection system 101 is configured for receiving first data from respective honeypot system 122 and second data from other intrusion detection systems 101B-N to which it is connected.

For example, the received data may indicate a timestamp of an occurred event, the used protocol of the event such as TCP, the IP address from which the attack is coming, the port number of the source, the destination IP address etc. The content of the received data may thus be used to provide features such as IP addresses, timestamp, and frequency information. The frequency information may for example indicate the occurrence frequency of a feature such as an IP address was present in the received data e.g. for the last day, or last year etc.

In the normal operation mode, the intrusion detection system 101 may further run a predefined classification algorithm using the received data for generating a prediction model of malicious attacks. The classification algorithm may use a machine learning algorithm. The machine learning algorithm refers to a computer algorithm used to extract useful information from training data by building probabilistic models in an automated way. The machine learning may be performed using one or more learning algorithms such as linear regression, K-means etc.

For example, at least part of the received data may be used as a training set for training the classification algorithm. The training set may for example include a known set of benign URLs and a known set of malicious URLs as obtained from the received data. The classification algorithm may be configured to extract features associated with the known URLs, and use the machine learning algorithm to train the classification and generate a model (e.g. rules) to detect and categorize an unknown malicious URL. For example, in case of a spam honeypot the training set may comprise emails and their classification as spam or non-spam. The generated model may comprise one or more rules defining conditions on values of the at least part of the features. For example, a rule may compare a given IP address with a predefined IP address or range of addresses etc.

In the normal operation mode, the intrusion detection system 101 may further determine a model evaluation metric of the prediction model, and provide the prediction model if the model evaluation metric fulfills a predefined validation condition. The model evaluation metric may be a classification accuracy of the classification algorithm and the validation condition requires that the classification accuracy is higher than a predefined accuracy threshold. The classification accuracy may be the proportion of the total number of predictions that were correct. For example, the model evaluation metric may comprise a recall (or true positive rate) or may be quantified using a receiver operating characteristic (ROC) curve analysis, specifically, area under the curve (AUC). The recall may indicate the proportion of alerts that were correctly identified.

The intrusion detection system 101 may be a signature based intrusion detection system and/or anomaly based intrusion detection system. In case of a signature based intrusion detection system, the classification algorithm may be based on a basic classification problem. For example, the classification algorithm may use (e.g. simplified) machine learning structures for generating the model. The classification algorithm may be configured to identify signatures in the received data and the generated model may, for example, be configured to compare incoming events or received data with the identified signatures, if a match is found then an alert occurs, otherwise it means no malicious event is found.

Figure 3:
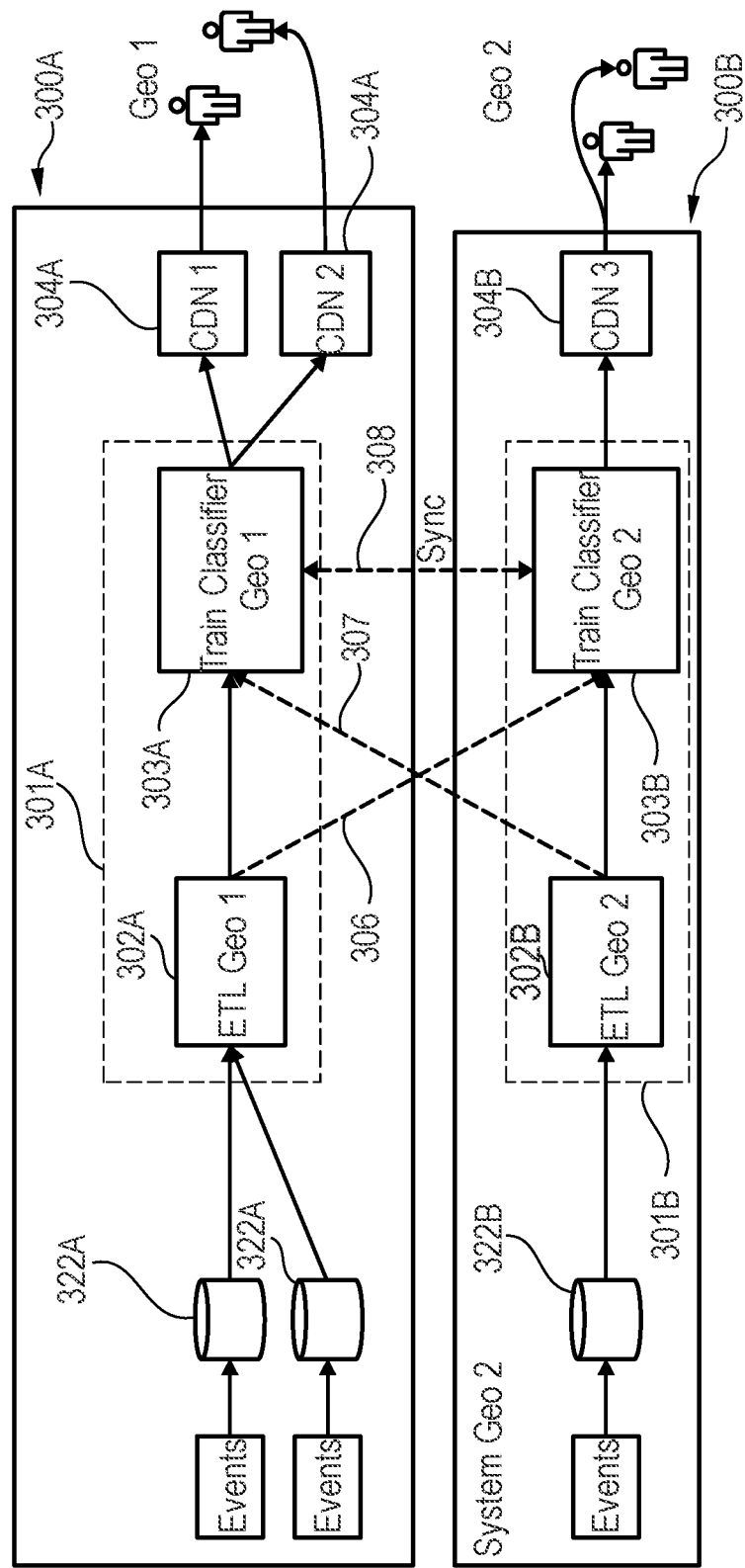
FIG. 3 depicts an example of two threat intelligence systems for email spam and virus detection.

FIG. 3 depicts an example of two threat intelligence systems 300A-B for email spam and virus detection. Each of the threat intelligence systems 300A-B comprises respective honeypots 322A and 322B for collection of sample event data. Honeypots 322A-B may be individually set up machines exposed to the internet and are susceptible to attacks from malicious entities. By this, honeypots 322A-B receive email spams, intrusion attempts via TCP/IP, etc.

The information received from the honeypots 322A-B is pre-processed by respective ETL modules 301A-B. For example, the pre-processing may comprise: the extraction of required features for training by e-mail parsers. The features may for example comprise IP addresses, subject, header fields, body text, attachments, hashes etc. A pre-processing example comprises extracting an email address by a regular expression, transforming by splitting local part, domain, and top-level domain, which then are loaded into a data store for further processing.

Each of the threat intelligence systems 300A-B comprises a classifier 303A-B or classifying algorithms. Each of the classifiers 303A-B is trained by the pre-processed data (e.g. the computed features) of the respective ETL module 301A. A classifier 303A-B may be a statistical program (e.g. naïve Bayes or rating systems) which categorizes incoming data in classes. For example, the classifier 303A-B may categorize E-Mails in the classes "spam" or "not spam". The parameters are computed from the received honeypot data (after being pre-processed by the ETL module) and known "not spam" examples, in order to reach a high accuracy in classification. These parameters may be referred to as "signatures" and are synchronized and checked for consistency across the threat intelligence systems 300A-B.

The resulting signatures of the classifiers 303A-B are shipped to a distributed content delivery network (CDN) including content delivery network 304A and content delivery network 304B. Customer appliances may download this data in CDNs 304A-B. The data may then be used by the customer appliances to classify their own incoming data streams, e.g. on mail spam filters or firewalls.

The classifier 300A-B and the ETL module 302A-B may be part of a respective intrusion detection system 301A-B.

As indicated in FIG. 3, the ETL module 302A and 302B are connected to classifiers 303B and 303A respectively via a first connection 306 and second connection 307. The classifiers 303A-B are connected to each other via a third connection 308. The first and second connections may be used to exchange the outputs of the ETL modules 302A-B. The third connection may be used to exchange signatures between the classifiers 303A-B.

Figure 4:
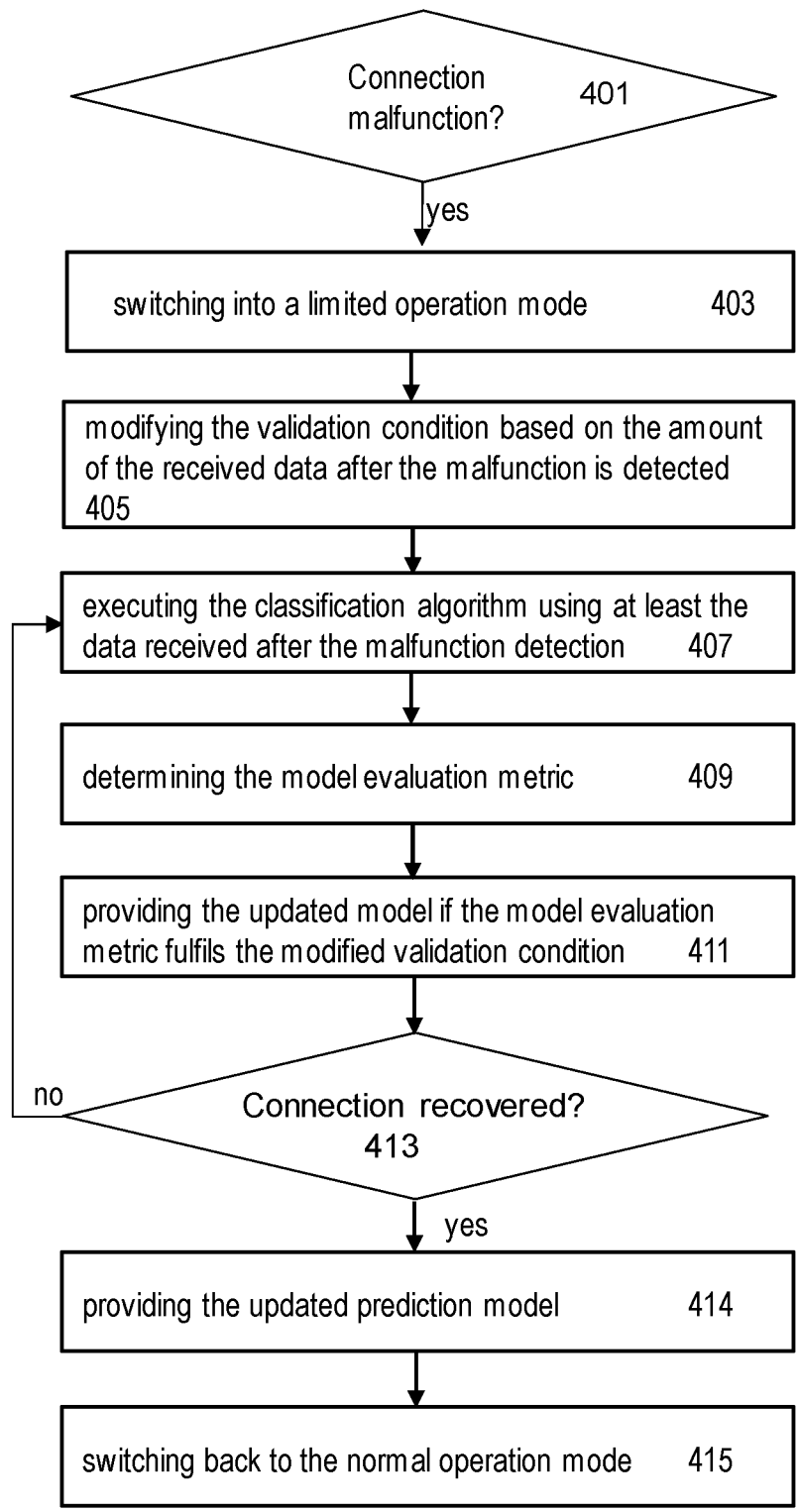
FIG. 4 is a flowchart of a method for classification of suspicious activities by a first intrusion detection system in accordance with the present disclosure.

FIG. 4 is a flowchart of a method for classification of suspicious activities by a first intrusion detection system e.g. 101A or 301A. As described herein the first intrusion detection system 101A receives first data from respective honeypot system 122 and second data from other intrusion detection systems to which the first intrusion detection system is connected.

In inquiry step 401, it may be determined or detected if a malfunction of at least one of the connections 99aj (where j=1, 2 . . . , N) is occurred. If for example, N=4 in FIG. 1, the number of connections between the system 100A and the other systems 100B-N, may be at least three connections e.g. connections 99ab, 99ac, 99an.

The detection of the malfunction for a given connection may for example comprise determining that the data is not received via the given connection at all at the first intrusion detection system 101A or that the data that is received via the given connection at the first intrusion detection system 101A is corrupted or partially lost. The loss of data may for example be due to packet loss when one or more packets of data travelling across the network fail to reach the first intrusion detection system 101A. The malfunction may for example be caused by a software and/or hardware failure of the software and/or hardware that enables the connections. For example, the first intrusion detection system may connect to a network by a controller device. The malfunction may for example occur at the controller device e.g. if the power was switched off. For example, the malfunction may be caused by a malfunction of fiber cables of the network e.g. a break in the cable. The malfunction may in another example be caused by malicious software such as spywares and viruses that may run on the first intrusion detection system and may interfere with the data.

For example, if the number of malfunctioning connections is higher than a predefined threshold e.g. 0, the malfunction may be detected. The malfunction may for example be detected or occurred at time t0.

In case of detecting the malfunction, the first intrusion detection system 101A may switch, in step 403, into a limited operation mode (or failure mode) of the first intrusion detection system 101A. In the limited operation mode, the first intrusion detection system 101A may be configured to perform following steps.

In step 405, the validation condition as defined with reference to FIG. 2 may be modified (e.g. the validation condition may be loosen) based on the amount of the received data after the malfunction is detected.

For example, the validation condition may be modified based on the malfunction detection. Following the above example of FIG. 2, the accuracy threshold may be lowered. For example, the higher the number of malfunctioning connections of the first intrusion detection system the lower the accuracy threshold is.

In step 407, the classification algorithm may be rerun or executed using at least the data received after the malfunction detection. This may result in updating the prediction model. For example, the rules of the model may change after re-running the classification algorithm. In one example, the classification algorithm may be executed on the data that is received after the malfunction occurred. In another example, the data received before the malfunction is detected or occurred may in addition be used for processing the classification algorithm.

In step 409, the model evaluation metric may be determined for the updated prediction model.

In step 411, the updated prediction model is provided if the model evaluation metric fulfils the modified validation condition.

In one example, steps 407-411 may be performed upon recovering at least part of the malfunctioning connections. For example, if a predefined fraction (e.g. 100%) of malfunctioning connections is recovered steps 407-411 may be executed.

In another example, if (inquiry step 413) after executing step 411, the at least part of the malfunctioning connections is not yet recovered, steps 407-411 may be repeated. The repetition may be performed until recovering the at least part of the malfunctioning connections. The recovery may for example be at time t1.

In step 414, upon recovering the at least part of the malfunctioning connections the updated prediction model or a combined model resulting from a combination of the updated model with the lastly generated prediction model may be provided. The recovery may comprise fixing the cause of the malfunction e.g. reconnecting if the internet connection was lost; power recovery; fixing the break in the fiber cables.

In step 415, the first intrusion detection system may switch back to its normal operation mode. After switching back to the normal operation mode, data of the first intrusion detection system 100 may be synchronized with the intrusion detection systems to which the connection was malfunctioning. This may result in receiving third data comprising data that was not received by the first intrusion detection system from a given system during the malfunctioning of the connection to the given system. In the normal operation mode, the first intrusion detection system may use received first, second and third data. The first data used after the switching back to the normal operation mode may be the data received before and/or after time t1. The second data used after the switching back to the normal operation mode may be the data received before and/or after time t1.

Figure 5:
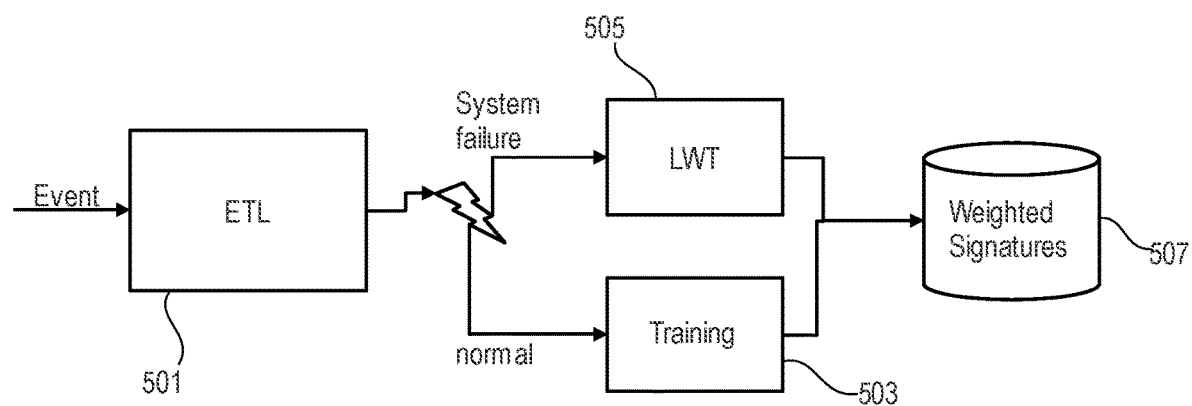
FIG. 5 is a flow diagram of an example method for providing signatures an intrusion detection system in accordance with the present disclosure.

FIG. 5 is a flow diagram illustrating an example method for providing signatures using for example the intrusion detection system 301A.

Data is received from honeypots 322A and from threat intelligence system 300B and transformed and aggregated, e.g. by ETL module 302A, as needed at block 501. For example, for each IP address in the received data, the type is determined (e.g. spam sending, attacking patterns, etc.) and aggregated. This yields for each IP address a record containing types and ratings.

The system 301A determines if it is in normal or failure mode, by regularly checking the reachability of the other threat intelligence system 300B. For that, a connectedness metric may be determined. The connectedness metric may be as follows:

$$\frac{\text{number of live or current connections}}{\text{number of expected connections}} \text{ or } \frac{\Delta f}{\Delta t},$$

the quotient of connection failures over time.

Using the determined values of the connectedness metric it may be determined if a failure mode is to be used. For example, a threshold may be defined such that if the value of the connectedness metric is higher than the threshold, the system 301A may operate in failure mode. In case of two threat intelligence systems of FIG. 3, the connectedness metric is higher than the threshold is an indication that the at least part of the connections 106, 107 and 108 is malfunctioning.

In the normal operation mode, a normal training algorithm may be used as indicated in block 503. In the failure mode, a lightweight (LWT) algorithm may be used as indicated in block 505.

In the normal operation mode, the aggregated data output of block 501 is weighted in the context of global information as enabled by the other threat intelligence system 300B, e.g. by decision trees, rulesets, support vector machines, etc. If a desired quality is reached, as defined by a quality measure such as precision/recall, area under curve (ROC-AUC), etc., the weighted data is exported to the customer as filter for the appliance.

On switching to failure mode, the lightweight algorithm of block 505 is chosen, while preserving the current state of the normal operation mode as a recovery point. The process of the lightweight algorithm stays the same as for the normal operation mode, but without at least part of global knowledge that is provided from the other threat intelligence system 300B because of the connection malfunction. This implies e.g. for spam, that certain tokens or IP addresses may occur less frequently in the data. To accommodate for this, the quality measure is lowered according to the value of the connectedness metric.

On system recovery, e.g. upon recovering the malfunctioning connections, the system 301A tries to find back its way to the normal operation mode. This can be achieved in different ways:

In one example, the data which went missing during the failure mode is ignored and the normal operation mode is directly resumed. Data is missing if it is not available on all threat intelligence systems equally. For example, the data went missing means that that data is not synchronized between the threat intelligence systems 300A-B e.g. the data not received by the intrusion detection system 301A from the threat intelligence system 300B during the failure mode is ignored. Over time, enough information for filtering may be retrieved and the normal quality requirements may be reached.

In another example, the data which went missing during the failure mode is ignored (e.g. the data not received by the intrusion detection system 301A from the threat intelligence system 300B during the failure mode is ignored), but the generated model during the failure mode is synchronized with the other threat intelligence systems. For example, signatures used in the generated model during the failure mode may be synchronized and aggregated (e.g. in case the signature is a given term the aggregation may consist of aggregating the numbers of occurrence of the given term that are obtained using different data) as indicated in block 507. For example, spam token counts are copied across all threat intelligence systems 300A-B e.g. such that the average with existing counts may be computed. This leads to an approximation of how the global knowledge developed during the failure mode.

In a further example, all missing data is synchronized between the threat intelligence systems e.g. the data not received by the intrusion detection system 301A from the threat intelligence system 300B during the failure mode is received after the recovery e.g. upon request by the threat intelligence system 301A. When this synchronization is finished, operation is switched back to the normal mode again, and calculation is continued from the point in time when the system failure occurred. Furthermore, signatures of all affected events are shipped to the CDN 304, regardless whether the system detected a change in the weighting or not. This step may ensure that all data deriving from the failure mode is replaced.

In the following, an example method for spam processing by an intrusion detection system e.g. 301A of a given threat intelligence system e.g. 300A, is described in different steps by FIGS. 6A-D.

Figure 6A:
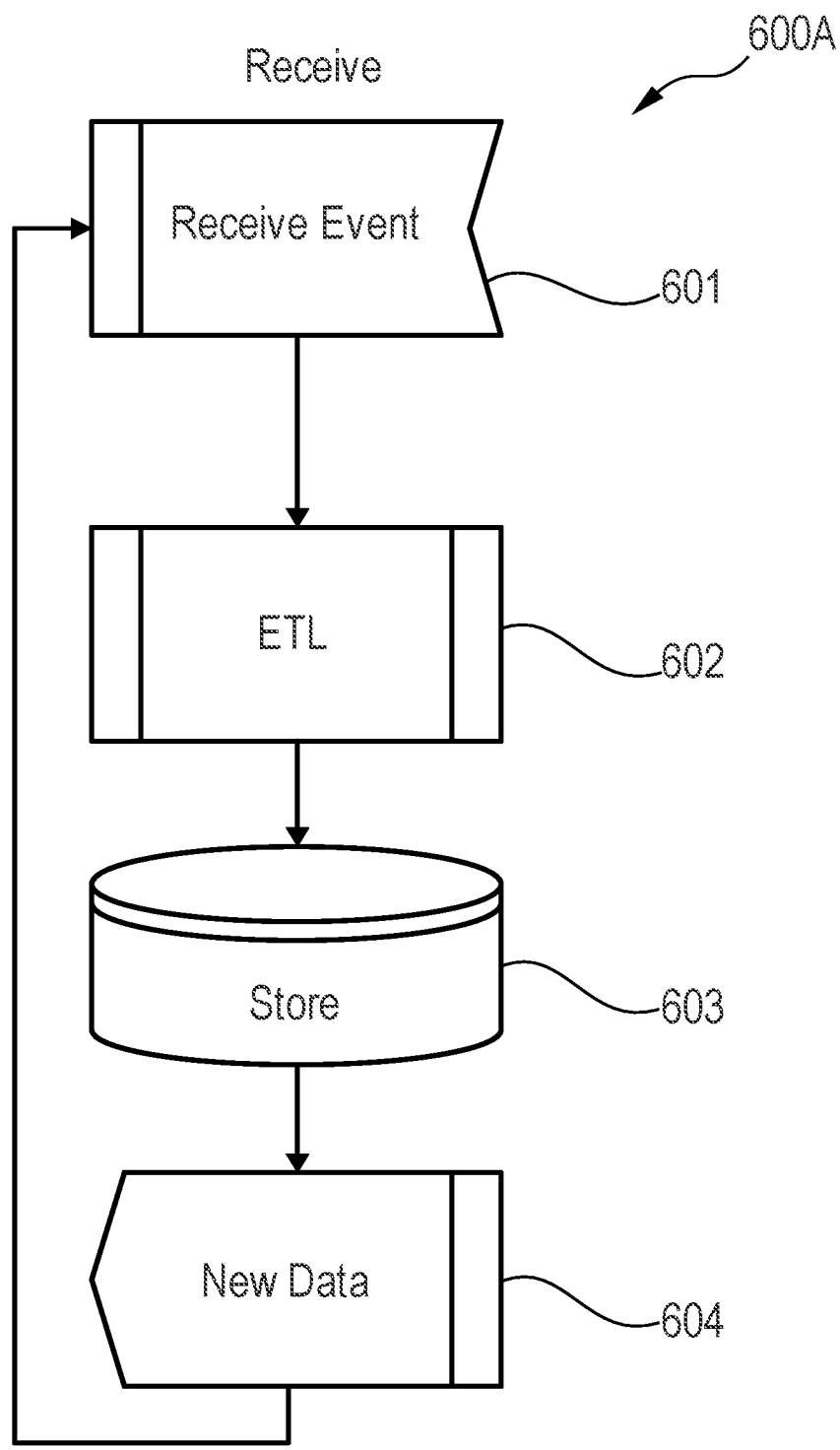
FIG. 6A is a flow diagram for a data receiving process in accordance with the present disclosure.

FIG. 6A is a flow diagram for a data receiving process 600A. The receive process 600A comprises step 601 of receiving incoming events comprising E-Mails from Spam/Ham-Sources. These e-mails are then parsed, normalized, and features are extracted in step 602 e.g. by an ETL module. The results of step 602 comprise sending IP addresses, normalized UTF-8 Subjects, attachment types and hashes, extracted text body Bayes tokens, etc. The results are stored in step 603 in a central store and the next processes (e.g. classifiers) are notified of new data of step 604. The new data may for example comprise the results of the processing of step 602 and/or received data of step 601 that has not been synchronized with the other threat intelligence systems.

Figure 6B:
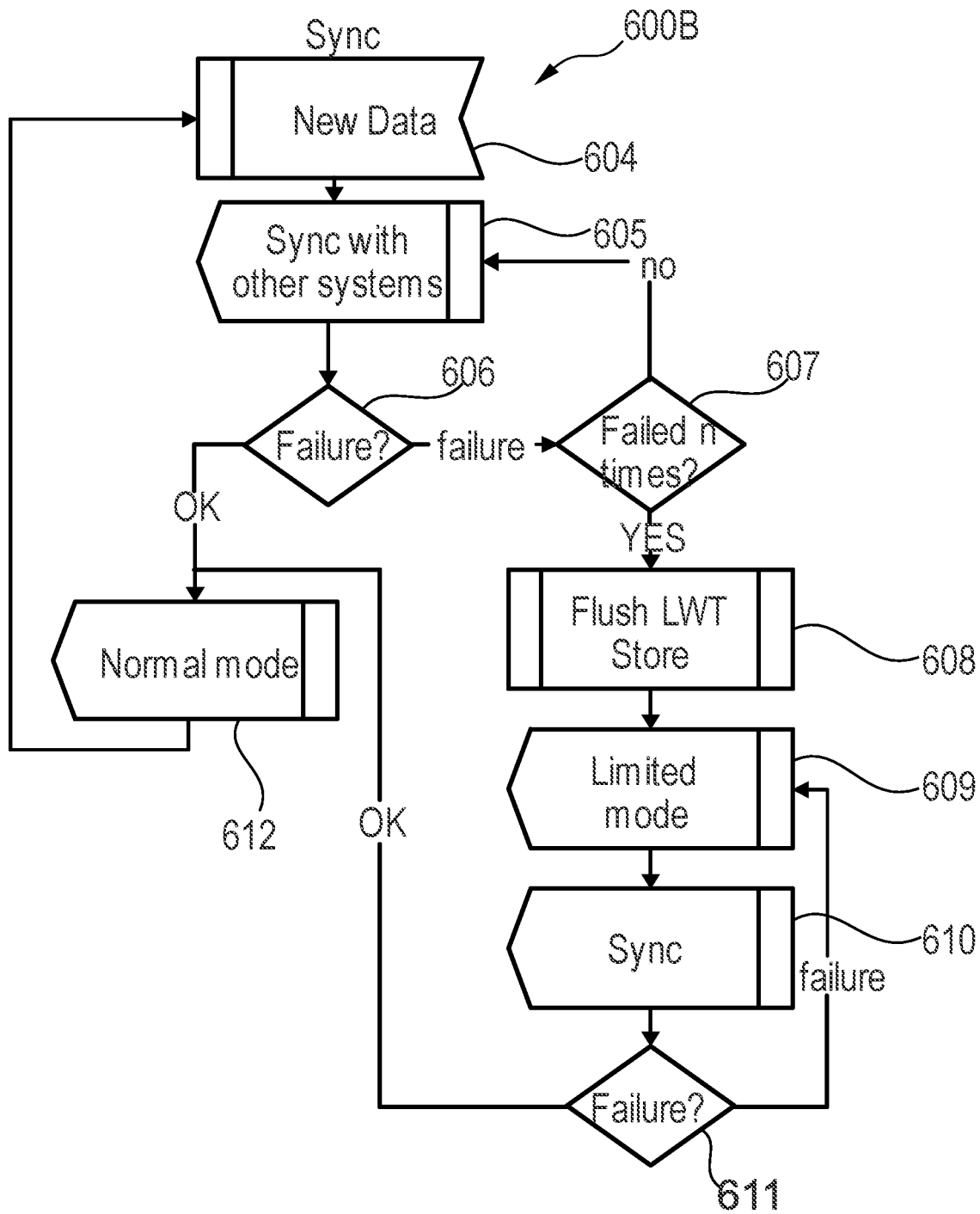
FIG. 6B is a flow diagram for a method for synchronizing new data across threat intelligence systems in accordance with the present disclosure.

FIG. 6B is a flow diagram for a method 600B for synchronizing the new data of step 604 across all threat intelligence systems. This implies copying the new data in step 605 to all threat intelligence systems which are connected to the given threat intelligence system. If (inquiry step 606) these operations were successful, the normal operation mode of the intrusion detection system 301A is triggered. In the normal operation mode, the received data and/or generated model may be stored in a normal mode store. If (inquiry steps 606 and 607) synchronization failed repeatedly with the majority of other threat intelligence systems (e.g. if Δf/Δt is higher than a predefined threshold), the limited operation mode is triggered. In the limited operation mode, all event data is stored in a separate store (referred to as failure mode store), while the normal mode store preserves the state before failure. On entering the limited operation mode, the given store is flushed in step 608, and the new data is put into it. Then, the limited operation mode computation is triggered in step 609, and subsequently, synchronization of the given store's data is triggered in step 610. If (inquiry step 611) the synchronization still fails, the intrusion detection system 301A stays in the limited operation mode. If connectivity to the majority (i.e. a number of threat intelligence systems higher than a predefined threshold) of threat intelligence systems has been re-established, the next step is to perform a recovery and get back to normal operating mode in step 612. In the normal operation mode a classifier may for example be generated for detecting spam emails, using the extracted features. E.g., if a sufficient amount of spam was received from a IP address, this address is exported as signature with a high weight. A customer's spam appliance will therefore, depending on its configuration, block all traffic from this address. Another example are Bayesian tokens. If e.g. unsolicited terms are were to be detected in a sufficient amount of spam mails, this token is exported as signature with a high weight. A customer's spam appliance will now block emails if this and other tokens occur in a mail in a significant amount, depending on their weight.

There are three example methods for performing the recovery as follows.

A first example is to ignore the data occurring within the timeframe of failure, and directly switch back to normal operation mode.

In a second example, only relevant weighted signatures are copied across all threat intelligence systems and merged. Relevance is determined by the event frequency and weight of a signature. To estimate the lower and upper threshold, a histogram of all events since the split is generated. Only events having middle event frequency are transferred. This because the extremely rare events convey no significance, while extremely frequent events are long going campaigns which may already be known to all sides. Another approach is to use the event frequency for time series prediction, e.g. using a Recurrent Neural Network to learn the time pattern. Only the most likely appearing again events are then synced. Both approaches lead to a significant lower volume in data to be transferred, and events to be processed.

In a third example, all data of all threat intelligence systems received during the limited operation mode, is synchronized into the normal data store. If this phase completes successfully, all threat intelligence systems again have the same set of data, and therefore can resume normal operation.

Figure 6C:
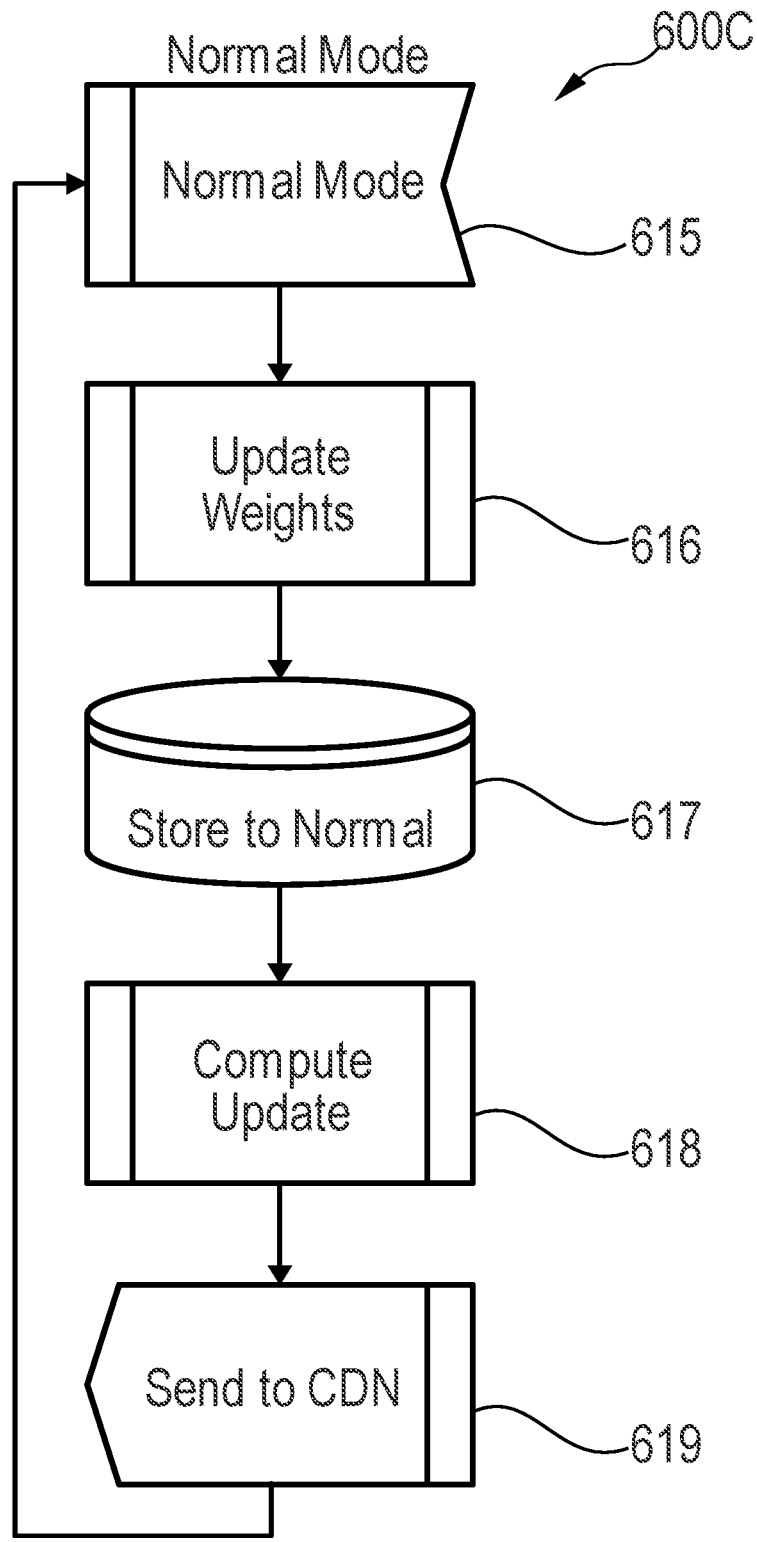
FIG. 6C is a flow diagram of a method for data processing in the normal operation mode in accordance with the present disclosure.

FIG. 6C is a flow diagram of a method 600C for data processing in the normal operation mode. The intrusion detection system when it is (step 615) in the normal operation mode it has access to all global data and features. This implies all weights can be interpreted and computed in step 616 with authority. The results are stored in step 617 again in the data store. Next, the update is computed in step 618 by aggregating all changed weights, and subsequently shipped in step 619 to the CDN for distribution to customer's appliances.

Figure 6D:
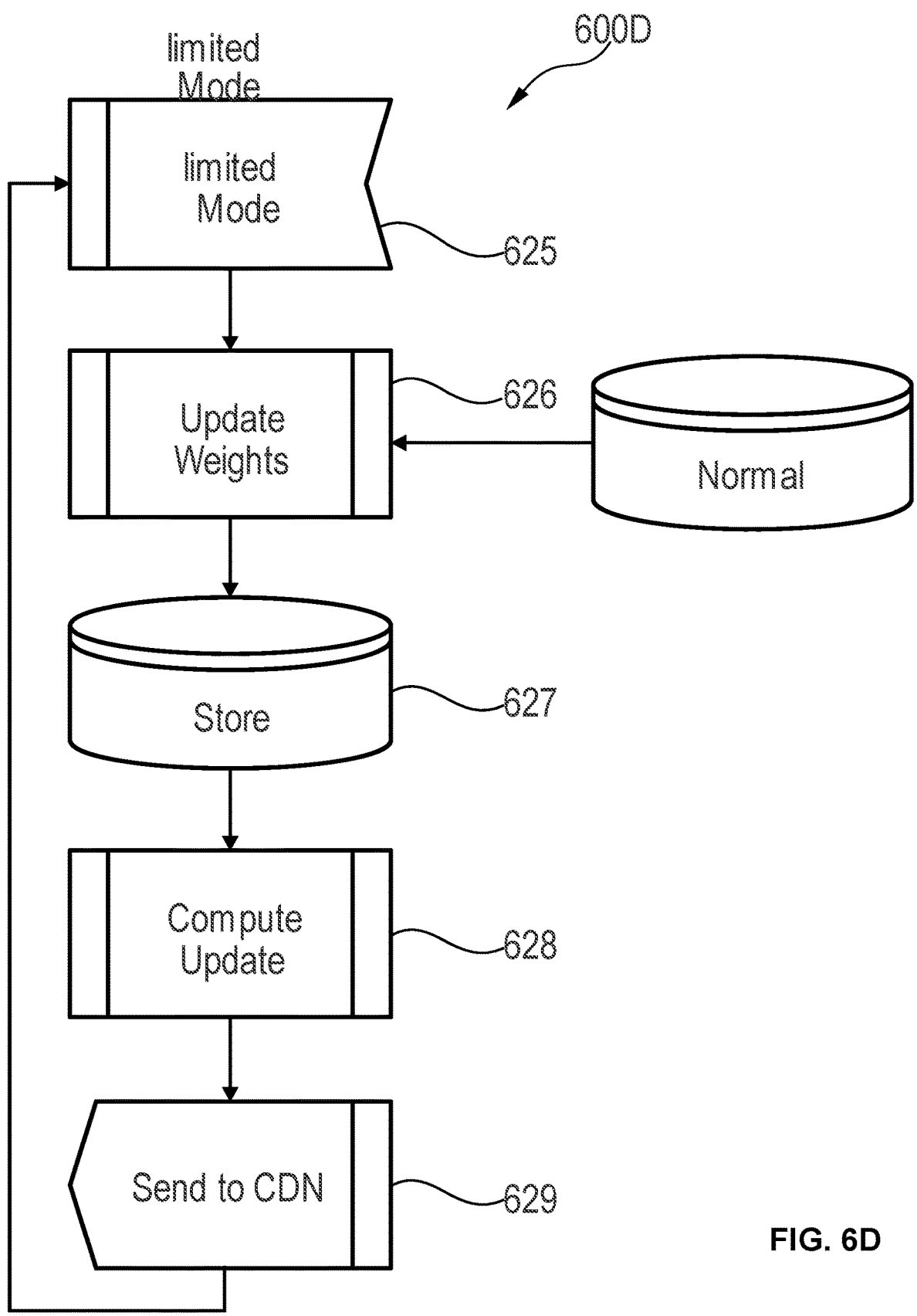
FIG. 6D is a flow diagram of a method for data processing in the limited operation mode in accordance with the present disclosure.

FIG. 6D is a flow diagram of a method 600D for data processing in the limited operation mode. Due to the connection malfunction, the intrusion detection system when it is (step 625) in the limited operation mode it does not have access to all global data and features. This implies weights may be interpreted and computed instep 626 with authority. The quality criteria may thus be lowered according to the connectedness to other threat intelligence systems. For computation, not only the data of the failure mode store is used, but the old data from the normal mode store is also used. The results are stored in step 627 again in the failure mode store. Next, the update is computed in step 628 by aggregating all changed weights, and subsequently shipped in step 629 to the CDN for distribution to customer's appliances.

The data may be merged after switching back to normal operation mode. As described above, all data from the failure mode store is processed according to one of the described methods. The remaining data is transferred to the other threat intelligence systems and processed as normal events.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
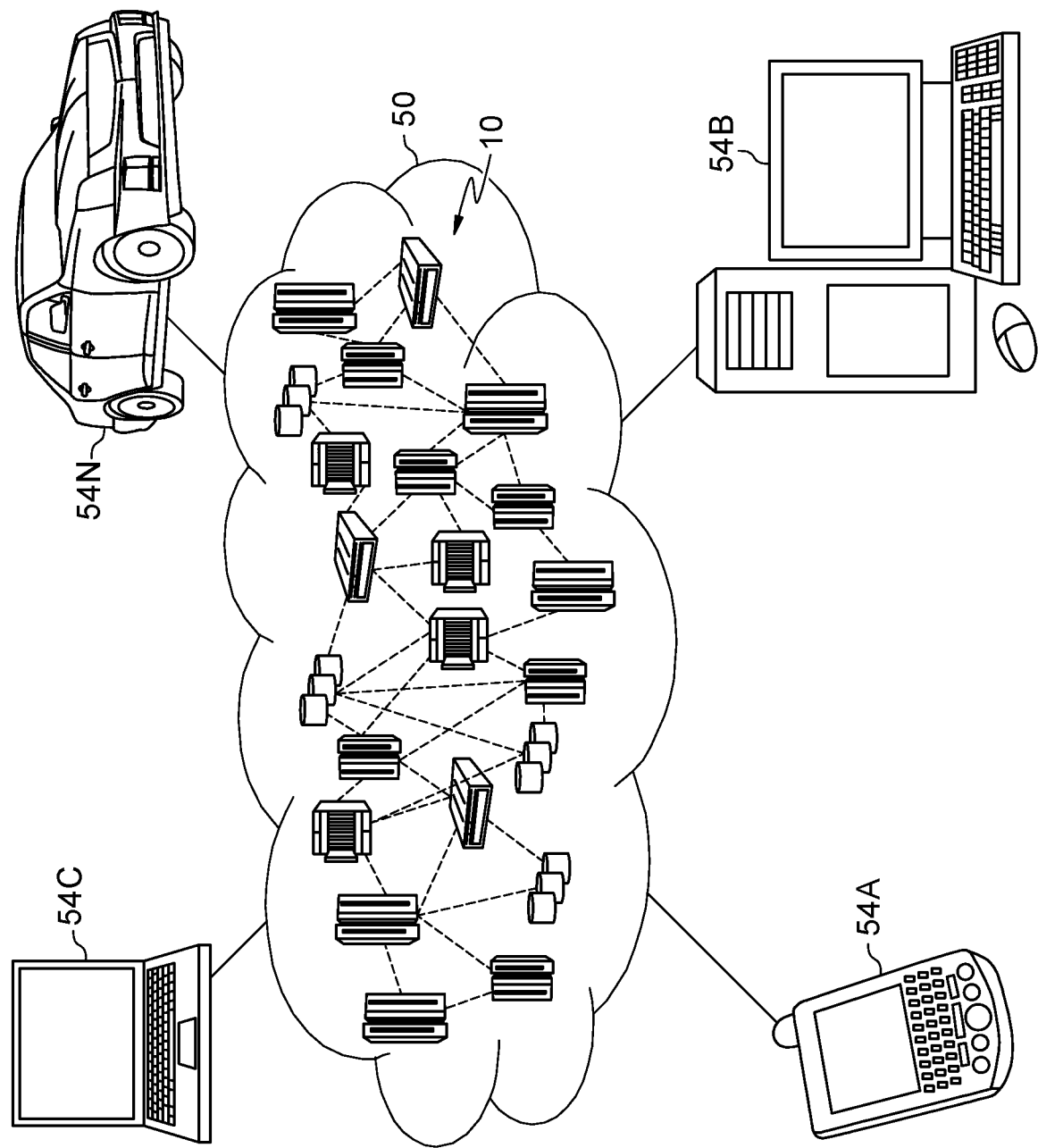
FIG. 7 depicts a cloud computing environment, in accordance with an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
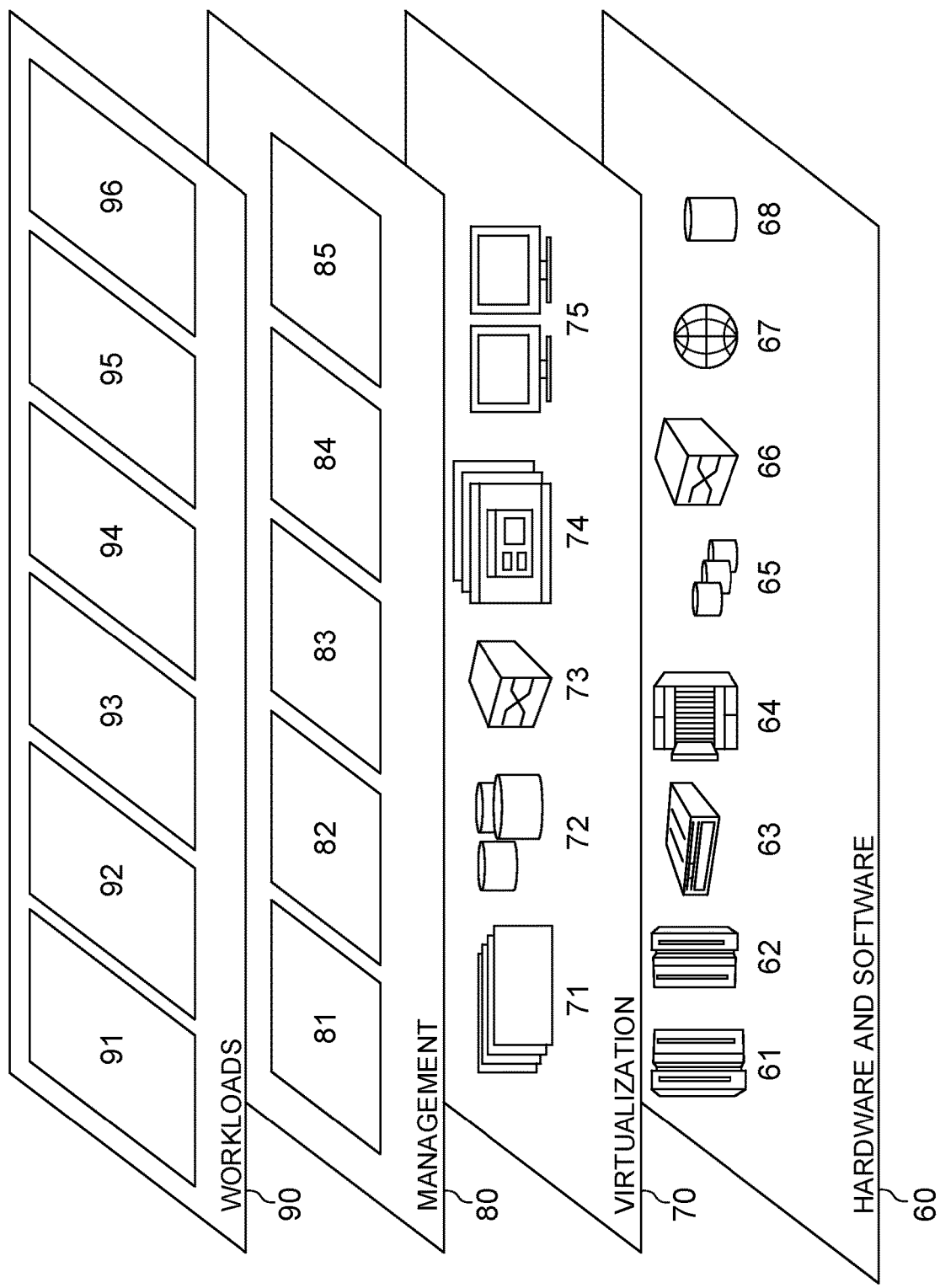
FIG. 8 depicts abstraction model layers, in accordance with an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intrusion detection 96. Intrusion detection 96 may include functionality for enabling the cloud computing environment to perform steps of the disclosed method, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A method for classification of suspicious activities by a first intrusion detection system, wherein the first intrusion detection system is connected to a second intrusion detection system by a first communications connection, and wherein the first intrusion detection system comprises a normal operation mode by which the first intrusion detection system is implemented in:
- receiving first data from one or more honeypot systems and second data from the second intrusion detection system;
- generating a prediction model for representing malicious attacks, wherein the prediction model is generated by execution of a predefined classification algorithm with respect to the received first and second data;
- determining a model evaluation metric with respect to the prediction model; and
- deploying the prediction model for use in detecting the malicious attacks, wherein the prediction model is deployed if the model evaluation metric meets a predefined validation condition, and wherein the malicious attacks are detected based on the classification of suspicious activities;
- wherein the method for classification of suspicious activities comprises:
  - in response to detecting a malfunction of the first communications connection, switching the first intrusion detection system from the normal operation mode to a limited operation mode;
  - updating the predefined validation condition based on the amount of the received first and second data after the malfunction is detected;
  - executing the predefined classification algorithm with respect to the received first and second data as received after the malfunction is detected to update the prediction model;
  - determining the model evaluation metric with respect to the updated prediction model;
  - deploying the updated prediction model for use in detecting the malicious attacks, wherein the updated prediction model is deployed if the model evaluation metric meets the updated predefined validation condition;
  - repeating the execution of the predefined classification algorithm to repeatedly update the prediction model;
  - repeating the deployment of the repeatedly updated prediction model until the malfunctioning first communications connection is recovered; and
  - in response to detecting the recovery of the first communications connection, deploying the most recently updated prediction model or a combined model for use in detecting the malicious attacks, wherein the combined model is comprised of the most recently updated prediction model and the generated prediction model; and switching the first intrusion detection system from the limited operation mode back to the normal operation mode.

2. The method of claim 1, wherein switching back to the normal operation mode comprises:
- synchronizing data with the second intrusion detection system, thereby receiving third data, wherein the third data comprises a portion of the second data that was not received by the first intrusion detection system during the malfunction of the first communications connection, wherein operation of the first intrusion detection system in the normal operation mode is performed using the received first, second, and third data.

3. The method of claim 1, wherein the first intrusion detection system is connected to multiple other intrusion detection systems via respective communications connections, wherein the malfunction of the first communications connection is detected if the fraction of malfunctioning connections is higher than a predefined threshold.

4. The method of claim 1, wherein the malfunction of the first communications connection is detected if the number of failures $\Delta f$ happened during $\Delta t$, is higher than a predefined threshold $$T_2 \frac{\Delta f}{\Delta t} > T_2.$$

5. The method of claim 1, wherein the second data is indicative of a prediction model that is generated by execution of the predefined classification algorithm by the second intrusion detection system.

6. The method of claim 1, further comprising:
- executing the predefined classification algorithm with respect to the received first and second data as received before the malfunction is detected.

7. The method of claim 1, wherein generating the prediction model for representing malicious attacks, wherein the prediction model is generated by execution of the predefined classification algorithm with respect to the received first and second data, comprises:
- identifying one or more signatures, wherein the prediction model is configured for comparing data with the signatures for determining, based on the comparison result, if the data is indicative of a malicious attack.

8. The method of claim 7, wherein comparing the data with the signatures is performed using signatures having a weight higher than a predefined weight threshold, wherein the weight is indicative of occurrence frequency of the signature.

9. The method of claim 7, wherein each of the one or more signatures is identified in at least one dataset of a given data type, and wherein synchronizing the data comprises:
- determining a number of datasets of the same data type that contains each signature; and
- in response to determining that the number of datasets is within a predefined range, sending the determined datasets to the second intrusion detection system.

10. The method of claim 7, wherein the model evaluation metric comprises a classification accuracy of suspicious activities by the predefined classification algorithm, wherein the validation condition comprises a predefined classification accuracy threshold, and wherein the prediction model is deployed if the classification accuracy by the predefined classification algorithm exceeds the predefined classification accuracy threshold.

11. The method of claim 10, wherein updating the predefined validation condition based on the amount of the received first and second data after the malfunction is detected comprises:
- lowering the predefined classification accuracy threshold.

12. The method of claim 11, wherein the predefined classification accuracy threshold is lowered based on a number of malfunctioning communications connections.

13. The method of claim 1, further comprising:
- determining, based on the prediction model, whether a message is a spam or non-spam message by comparison of one or more signatures of the prediction model with one or more signatures in the received first and second data.

14. The method of claim 1, wherein the prediction model comprises prediction model variables comprising at least one of: the number of occurrences of one or more predefined terms, spam token count, IP address values, URLs and email addresses.

15. A non-transitory computer program product, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method for classification of suspicious activities by a first intrusion detection system, wherein the computer system comprises the first intrusion detection system which is connected to a second intrusion detection system by a first communications connection, and wherein the first intrusion detection system comprises a normal operation mode by which the first intrusion detection system is implemented in:
receiving first data from one or more honeypot systems and second data from the second intrusion detection system;
generating a prediction model for representing malicious attacks, wherein the prediction model is generated by execution of a predefined classification algorithm with respect to the received first and second data;
determining a model evaluation metric with respect to the prediction model; and
deploying the prediction model for use in detecting the malicious attacks, wherein the prediction model is deployed if the model evaluation metric meets a predefined validation condition, and wherein the malicious attacks are detected based on the classification of suspicious activities;
wherein the method for classification of suspicious activities comprises:
in response to detecting a malfunction of the first communications connection, switching the first intrusion detection system from the normal operation mode to a limited operation mode;
updating the predefined validation condition based on the amount of the received first and second data after the malfunction is detected;
executing the predefined classification algorithm with respect to the received first and second data as received after the malfunction is detected to update the prediction model;
determining the model evaluation metric with respect to the updated prediction model;
deploying the updated prediction model for use in detecting the malicious attacks, wherein the updated prediction model is deployed if the model evaluation metric meets the updated predefined validation condition;
repeating the execution of the predefined classification algorithm to repeatedly update the prediction model;
repeating the deployment of the repeatedly updated prediction model until the malfunctioning first communications connection is recovered;
in response to detecting the recovery of the first communications connection, deploying the most recently updated prediction model or a combined model for use in detecting the malicious attacks, wherein the combined model is comprised of the most recently updated prediction model and the generated prediction model; and switching the first intrusion detection system from the limited operation mode back to the normal operation mode.

16. The non-transitory computer program product of claim 15, wherein switching back to the normal operation mode comprises:
synchronizing data with the second intrusion detection system, thereby receiving third data, wherein the third data comprises a portion of the second data that was not received by the first intrusion detection system during the malfunction of the first communications connection, wherein operation of the first intrusion detection system in the normal operation mode is performed using the received first, second, and third data.

17. A computer system with one or more processors and one or more memories for classification of suspicious activities, the computer system comprising a first intrusion detection system, wherein the first intrusion detection system is connected to a second intrusion detection system by a first communications connection, and wherein the first intrusion detection system comprises a normal operation mode by which the first intrusion detection system is implemented in:
receiving first data from one or more honeypot systems and second data from the second intrusion detection system;
generating a prediction model for representing malicious attacks, wherein the prediction model is generated by execution of a predefined classification algorithm with respect to the received first and second data;
determining a model evaluation metric with respect to the prediction model; and
deploying the prediction model for use in detecting the malicious attacks, wherein the prediction model is deployed if the model evaluation metric meets a predefined validation condition, and wherein the malicious attacks are detected based on the classification of suspicious activities;
wherein the classification of suspicious activities comprises:
in response to detecting a malfunction of the first communications connection, switching the first intrusion detection system from the normal operation mode to a limited operation mode;
updating the predefined validation condition based on the amount of the received first and second data after the malfunction is detected;
executing the predefined classification algorithm with respect to the received first and second data as received after the malfunction is detected to update the prediction model;
determining the model evaluation metric with respect to the updated prediction model;
deploying the updated prediction model for use in detecting the malicious attacks, wherein the updated prediction model is deployed if the model evaluation metric meets the updated predefined validation condition;
repeating the execution of the predefined classification algorithm to repeatedly update the prediction model;
repeating the deployment of the repeatedly updated prediction model until the malfunctioning first communications connection is recovered; and
in response to detecting the recovery of the first communications connection, deploying the most recently updated prediction model or a combined model for use in detecting the malicious attacks, wherein the combined model is comprised of the most recently updated prediction model and the generated prediction model; and switching the first intrusion detection system from the limited operation mode back to the normal operation mode.

18. The computer system of claim 17, wherein switching back to the normal operation mode comprises:
synchronizing data with the second intrusion detection system, thereby receiving third data, wherein the third data comprises a portion of the second data that was not received by the first intrusion detection system during the malfunction of the first communications connection, wherein operation of the first intrusion detection system in the normal operation mode is performed using the received first, second, and third data.

* * * * *